United States Patent [19]

Bradley

[11] Patent Number: 5,107,744
[45] Date of Patent: Apr. 28, 1992

[54] MUSIC RULE

[76] Inventor: Barry C. Bradley, 7748 Gloria, Van Nuys, Calif. 91406

[21] Appl. No.: 540,440

[22] Filed: Jun. 14, 1990

[51] Int. Cl.⁵ .......................................... G09B 15/08
[52] U.S. Cl. .......................................... 84/480
[58] Field of Search ............... 84/480, 471 SR, 473, 84/474, 475, 485 SR

[56] References Cited

U.S. PATENT DOCUMENTS 2,938,421  5/1960  Leonard ........................... 84/473 X
4,552,052  11/1985  Lee .............................. 84/471 SR X Primary Examiner—Brian W. Brown
Attorney, Agent, or Firm—Townsend and Townsend

[57] ABSTRACT

A music rule is disclosed for assistance in the identification of chord, scale and mode structure with respect to the (ivory) key structure of a piano. The scale has a scale body accommodating an interior sliding rule. The interior sliding rule includes two areas for exposure to the user of the rule. The first exposure area—and preferably the lowest exposure area—is an analog of the piano keyboard. This analog of the rule provides for error-free registration of the rule to the keys of the piano. The second—and preferably higher exposure area—contains note indicia representative of the actual notes which the sliding scale overlies. The sliding scale fits to a rule body having first and second window areas. The first window body constantly exposes the keyboard analog of the piano keys. This enables registration of the rule in the entirety to the correct position on the piano keyboard. The overlying exposure area has indicators operated in conjunction with a mathematical scale for music chords, scales and modes. Typically, this scale includes eight notes and five flats (or sharps). The note indicators are attached to the body of the scale and in the preferred embodiment move to uncover the note names. These moveable note indicators allow selected notes to be easily displayed and hence indicated as playable for any chord scale or mode.

8 Claims, 2 Drawing Sheets

MUSIC RULE

BACKGROUND OF THE INVENTION

This invention relates to pianos and other keyboard instruments. More particularly, a rule is disclosed which enables ready display of eligible keys for generating chords, scales, or modes in played music.

STATEMENT OF THE PROBLEM

Pianos and virtually all other keyboard instruments have versatility of chords, scales and modes. The good news is that all conceivable chords, scales and modes are readily available to the player. The bad news is that this very versatility and abundance of possibility is consummately confusing to the new (and even experienced) musician.

Furthermore, chords, scales and modes are all complicated by the particular key in which the music is played. The identity of a chord (major, minor, dominant, augmented, diminished, etc.) is confusing to new musicians. Further, the designation of a scale that gives music a Japanese, Chinese or even Blues characteristic eludes most players. Pentatonic (Chinese) modes are not readily identifiable from the remaining myriad of possibilities on the piano. Indeed, when one realizes the totality of chords, scales and modes available to any player, the presence of this confusion is not surprising.

SUMMARY OF THIS INVENTION

A music rule is disclosed for assistance in the identification of chord, scale, and mode structure with respect to the (ivory) key structure of a piano. The scale has a scale body accommodating an interior sliding rule. The interior sliding rule includes two areas for exposure to the user of the rule through apertures in the scale body. The first exposure area—and preferably the lowest exposure area—is an analog of the piano keyboard. This analog of the piano keyboard is in the sequential (usually black and white) sequence of the piano keys as they leave the body of the piano and cantilever to the finger depression area for the playing of the piano. This analog section of the rule provides for error-free registration of the rule to the keys of the piano. The second—and preferably higher exposure area—contains note indicia representative of the actual notes which the sliding scale overlies. The sliding scale fits to a rule body having first and second window areas. The first window area on the scale body exposes the keyboard analog of the piano keys. This enables registration of the entire rule to the correct position on the piano keyboard. The overlying exposure area has indicators operated in conjunction with a mathematical scale for music chords, scales and modes. Typically, this scale includes selection between at least eight notes and five flats (or sharps). The note indicators are attached to the body of the scale and in the preferred embodiment move to cover and uncover the note names. These moveable note indicators allow selected notes to be easily displayed and hence indicated as playable for any chord, scale, or mode. Printed indicia on the rule tells the user of the particular combination of note indicators which can be utilized for displaying the notes eligible to be played for any music chord, scale or mode.

OTHER OBJECTS, FEATURES AND ADVANTAGES

It is an object of this invention to provide the user with a rule easily used in conjunction with the keyboard of a piano that enables ready identification of all chords, scales, and modes.

An advantage of the disclosed rule is that identification of the chords, scales and modes can easily be converted to any "key" in which the music is played.

A further advantage of the disclosed rule is that the memorization of a set of chords, scales and modes in any key is readily facilitated by the continued use of the rule. There is presented for the first time a device, which in conjunction with a keyboard from a keyboard instrument (such as a piano), instrument's complete versatility.

Yet an additional advantage of this invention is that ready reference can be made from the use of the scale analog to the written form or music commonly used with staff lines — including the treble staff and the base staff. The treble and base staffs appear. The specific note notations appear on the staffs just as conventional notes appear on such staffs in conventional music. By identifying the note indicia with its placement on the treble and base staffs, writing of music in the selected scale is encouraged.

It will be realized that the attached scale analog is especially useful in assisting and encouraging improvisation. Specifically, the novice (or even experienced) music writer has his note selection restricted by the designations of the analog scale. By heeding these restrictions on note selection — but otherwise using his natural music ability — composition within any given music scale (or style) is facilitated.

Further, changing from one key to another is facilitated. Transposition — the changing of music from one key to another — can be facilitated. Specifically, by going from the key notes to the number notes on the scale, the first part of such transposition can occur. By moving the scale to a new setting — and effecting the musical composition utilizing the number notes — transposition to the letter notes in the new key can simply and naturally occur.

DETAILED DESCRIPTION OF THE DRAWINGS

Other objects, features and advantages will become more apparent after referring to the following specification and attached drawings.

Figure 1:
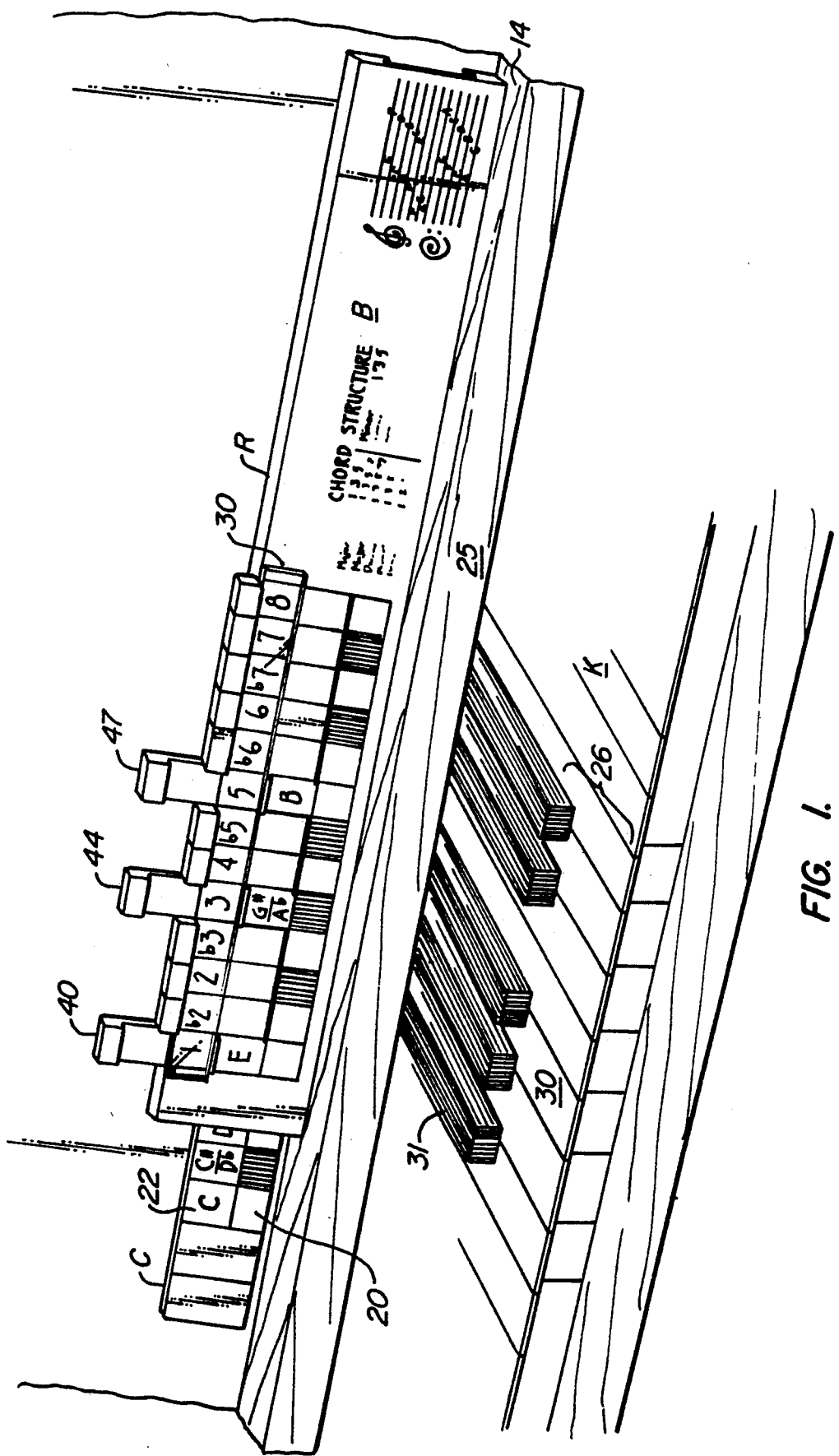
FIG. 1 is a perspective view of a keyboard instrument keyboard with the music scale of this invention shown overlying the keyboard where the keys cantilever out from the instrument for depression at key depression areas.

The music rule includes a body B and a relatively moving rule member C.

Rule member C includes a first and lower exposure area 20. Typically area 20 is provided with an analog reference to the keys K of the piano where they leave the body of piano 25 and cantilever out to the finger depression areas 26 of the piano. As can be seen, lower exposure area 20 has an analog structure format. This analog is precisely identifiable to and overlies the main note keys 30 as well as the sharp and flat (black) keys 31.

Above the analog exposure area 20 there is contained a note indicia area 22. Note indicia area 22 identifies with precision each of the notes played by the keys as they cantilever out from the piano body at 25.

The rule body B has a mathematical note indicating scale 30. Note indicating scale 30 includes 13 indicated notes, these notes being 1-8 and including so-called "flat" notes.

Those skilled in music will recognize notes 1 and 8 as an octave; the notes repeat but in higher (or lower) tonal range.

In operation, as for the playing of a so-called major chord in the key of E, key indicating tabs 40, 44, and 47 are raised to identify the major chord in the key of E which major chord includes E, G# and B. The key itself is designated by the mathematical indicia 1 overlying the particular note in the area of the rule known as 1.

Figure 2:
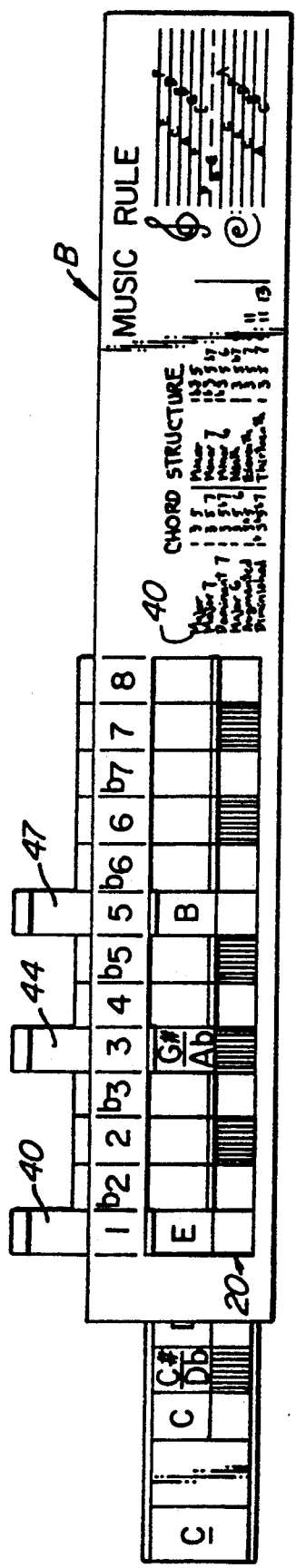
FIG. 2 is a perspective view of the rule separate from the keyboard of FIG. 1.

Referring to FIG. 2, the rule is shown separate from the piano keyboard. The mathematical chord structure of a major key is indicated under the delineation "chord structure" at 40. This chord structure includes the numeric indicia "1", "3" and "5".

It can be seen that the note indicators 40, 44 and 47 have all been raised to the upward position.

Note indicator 40 denominates the key of E. It also denominates the fact that the piano note E need be played for a so-called major chord.

Key 3 denominates that the major chord includes G#. Finally, key 47 denominates that the final key for the major chord is B.

It is noted that the analog area 20 discloses the position of the actual "black ivory" on the piano. Thus, by using the analog area, the rule registration of both rule body B and the sliding scale C is unmistakable.

It can be seen that the indicia for chord structure in major format is imprinted on the body B.

Figure 3:
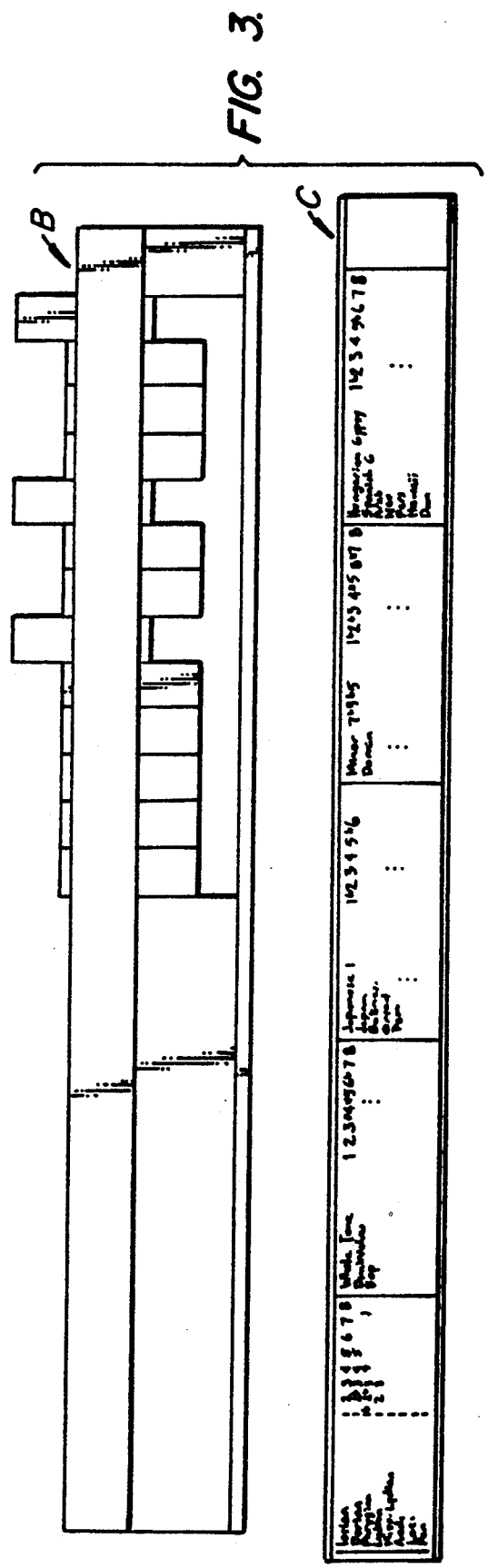
FIG. 3 is a view of the sliding portion of the rule relative to the body of the rule, the sliding portion being withdrawn from the rule body; and Referring to FIG. 1; a rule R is shown overlying the keyboard K of a keyboard instrument, here a piano P. The rule is typically placed on a ledge 14 which ledge defines an instrument resident music stand for supporting music.

Referring to FIG. 3, the reverse of the sliding scale C is illustrated. Illustrating both modes and scales which modes and scales identify varying combinations of music that can be played.

The reader will understand that I have preferred to designate the notes that can be played for any chord, scale or mode by completely covering the notes with respect to the slidable keys 40, 44, and 47. It will be understood that other modes of indicating the eligible keys may work as well. For example, transparencies or pointers may suffice.

Further, it should be understood that the printed indicia referring to the mathematical scale 30 is not intended to be exhaustive. Those having skill in the music arts will undoubtedly note that many departures can be made.

What is claimed is:

1. A music rule comprising,
    a first member marked with a plurality of indicia representing thirteen notes in a musical octave:
    a second member, marked with a plurality of letter notes representing musical notes usable in a chord, scale, or mode, said second member being slidably attached to said first member such that each of said indicia can be aligned with one of said letter notes;
    a plurality of movable note indicators attached to said first member, each note indicator positioned so as to correspond to an indicium and being capable of alternately covering or exposing said letter notes, thereby indicating letter notes which are usable in a chord, scale, or mode in a desired key.
2. A music rule of claim 1 wherein said indicia are numerical notes representing eight whole tones and five flats or sharps in a musical octave.
3. A music rule of claim 1 wherein said second member is receivable within said first member.
4. A music rule of claim 1 further comprising printed indicia for identifying letter notes usable in a chord, scale, or mode.
5. A music rule of claim 1 wherein the second member further comprises an analog of a piano keyboard for identifying keyboard keys usable in a chord, scale, or mode.
6. A music rule of claim 1 in combination with a keyboard instrument.
7. A method of identifying the letter notes of a chord, scale, or mode in a predetermined key, the method comprising the steps of:
    providing a music rule comprising a first member marked with indicia representing thirteen notes in a musical octave, said first member being slidably attached to a second member marked with letter notes representing musical notes usable in the chord, scale, or mode, said first member having movable note indicators corresponding to each indicium;
    sliding said second member relative to said first member such that a letter note designating said predetermined key is aligned with an indicium designating the first note of the musical octave;
    moving said note indicators from a closed to an open position thereby uncovering said letter notes for the chord, scale or mode.
8. A method of claim 7 wherein said indicia are numerical notes representing eight whole tones and five flats or sharps in a musical octave.

* * * * *